(12) United States Patent
Tong et al.

(10) Patent No.: US 12,273,326 B2
(45) Date of Patent: Apr. 8, 2025

(54) ETHERNET DATA TRANSMISSION CIRCUIT AND SYSTEM AND ETHERNET DATA TRANSMISSION METHOD

(71) Applicant: SHENZHEN PANGO MICROSYSTEMS CO., LTD, Shenzhen (CN)

(72) Inventors: Yibo Tong, Shenzhen (CN); Ren Li, Shenzhen (CN); Rui Yao, Shenzhen (CN)

(73) Assignee: SHENZHEN PANGO MICROSYSTEMS CO., LTD, Shenzhen (CN)

( * ) Notice: Subject to any disclaimer, the term of this patent is extended or adjusted under 35 U.S.C. 154(b) by 487 days.

(21) Appl. No.: 17/732,558

(22) Filed: Apr. 29, 2022

(65) Prior Publication Data
US 2022/0263808 A1  Aug. 18, 2022

Related U.S. Application Data

(63) Continuation of application No. PCT/CN2021/079687, filed on Mar. 9, 2021.

(30) Foreign Application Priority Data

Dec. 30, 2020  (CN) .......................... 202011611995.7

(51) Int. Cl.
*H04L 9/40* (2022.01)
(52) U.S. Cl.
CPC ............................. *H04L 63/0428* (2013.01)

(58) Field of Classification Search
None
See application file for complete search history.

(56) References Cited

U.S. PATENT DOCUMENTS

| | | | |
|---|---|---|---|
| 5,727,006 A | 3/1998 | Dreyer et al. | |
| 5,903,613 A | 5/1999 | Takuya | |
| | | (Continued) | |

FOREIGN PATENT DOCUMENTS

| | | |
|---|---|---|
| CN | 200950596 | 9/2007 |
| CN | 101262397 A | 9/2008 |
| | (Continued) | |

OTHER PUBLICATIONS

CNIPA, First Office Action for CN Application No. 202011611995.7, Aug. 30, 2021.

(Continued)

*Primary Examiner* — Bassam A Noaman (57) ABSTRACT

An Ethernet data transmission circuit, an Ethernet data transmission system and an Ethernet data transmission method are provided. The Ethernet data transmission circuit includes: a polarity processing circuit for processing a polarity carried by Ethernet data into a preset polarity; and an encoder for receiving the Ethernet data and the preset polarity carried by the Ethernet data, and encoding the Ethernet data. On the one hand, the security of Ethernet in a transmission process can be improved; on the other hand, without increasing workload of the encoder, the polarity processing circuit of the Ethernet data transmission circuit can be used to process the Ethernet data to be with a preset polarity, to facilitate the encoder to code.

9 Claims, 5 Drawing Sheets

(56) References Cited

U.S. PATENT DOCUMENTS

| | | | |
|---|---|---|---|
| 6,980,543 B1* | 12/2005 | Kastenholz | H04L 49/15 370/386 |
| 2002/0027888 A1 | 3/2002 | Rancho et al. | |
| 2006/0153109 A1* | 7/2006 | Fukumoto | H04B 13/00 370/310 |
| 2008/0045151 A1 | 2/2008 | Michihiko et al. | |
| 2008/0186996 A1 | 8/2008 | Scott et al. | |
| 2012/0278656 A1 | 11/2012 | Sven et al. | |
| 2013/0028311 A1 | 1/2013 | Tien et al. | |
| 2015/0057007 A1 | 2/2015 | Alireza et al. | |
| 2020/0228229 A1 | 7/2020 | Ramin et al. | |
| 2020/0403814 A1 | 12/2020 | Harald et al. | |
| 2021/0004885 A1* | 1/2021 | Abitbol | G06N 7/01 |
| 2022/0120560 A1* | 4/2022 | Chican | G06V 10/145 |

FOREIGN PATENT DOCUMENTS

| | | |
|---|---|---|
| CN | 101330503 | 12/2008 |
| CN | 101997551 A | 3/2011 |
| CN | 102195838 A | 9/2011 |
| CN | 201994962 | 9/2011 |
| CN | 202085187 | 12/2011 |
| CN | 102523142 A | 6/2012 |
| CN | 103561233 A | 2/2014 |
| CN | 103780284 A | 5/2014 |
| CN | 105049311 A | 11/2015 |
| CN | 106254232 A | 12/2016 |
| CN | 106533613 A | 3/2017 |
| CN | 106850374 | 6/2017 |
| CN | 107360195 A | 11/2017 |
| CN | 108282387 A | 7/2018 |
| CN | 109039375 | 12/2018 |
| CN | 110740011 A | 1/2020 |
| CN | 111656692 A | 9/2020 |
| EP | 1847033 B1 | 10/2007 |
| WO | 2006078730 A2 | 7/2006 |

OTHER PUBLICATIONS

CNIPA, Office Action issued for CN Application No. 202011611995.7, Dec. 22, 2021.

WIPO, International Search Report for PCT Application No. PCT/CN2021/079687, Sep. 22, 2021.

Hideki Kamitsuna, A 10 Gbit/s switch matrix MMIC using InP HEMTs with a logic-level-independent interface, Aug. 9, 2004, the whole document.

Zhu Yue, 1000BASE-T Gigabit Ethernet Transmitter Digital Signal Processing Computing Go to Research and VILS Design, Sep. 30, 2013, the whole document.

Written Opinion of the International Searching Authority for No. PCT/CN2021/079687.

* cited by examiner

ETHERNET DATA TRANSMISSION CIRCUIT AND SYSTEM AND ETHERNET DATA TRANSMISSION METHOD

CROSS REFERENCE OF RELATED APPLICATIONS

This application is a continuation of International Application No. PCT/CN2021/079687, filed on Mar. 9, 2021. The international Application claims priority to a prior Chinese patent application No. 2020116119957, filed to the China National Intellectual Property Administration on Dec. 30, 2020. The entire contents of the above-mentioned applications are incorporated herein by reference.

FIELD OF THE DISCLOSURE

The present disclosure relates to the field of communication technologies, and more particularly to an Ethernet data transmission circuit, an Ethernet data transmission system, and an Ethernet data transmission method.

BACKGROUND OF THE DISCLOSURE

Ethernet has advantages of high reliability, advanced management, good expansibility and low cost. At present, most of local networks use the Ethernet.

However, the Ethernet may have uncertain security problems during transmission in the physical layer.

SUMMARY OF THE DISCLOSURE

Embodiments of the present disclosure provide an Ethernet data transmission circuit, an Ethernet data transmission system and an Ethernet data transmission method, to address the above problems.

In a first aspect, an Ethernet data transmission circuit is provided. The Ethernet data transmission circuit includes a polarity processing circuit and an encoder. The polarity processing circuit is configured to process a polarity carried by Ethernet data into a preset polarity. The encoder is configured to receive the Ethernet data and the preset polarity carried by the Ethernet data, and encode the Ethernet data.

In a second aspect, an Ethernet data transmission system is provided. The Ethernet data transmission system includes a terminal and the Ethernet data transmission circuit described in the first aspect. The encoder is further configured to transmit the encoded Ethernet data to the terminal. The terminal is configured to receive and decode the encoded Ethernet data.

In a third aspect, an Ethernet data transmission method is provided. The Ethernet data transmission method includes: processing, by a polarity processing circuit, a polarity carried by Ethernet data into a preset polarity; and receiving, by an encoder, the Ethernet data and the preset polarity carried by the Ethernet data, and encoding the Ethernet data by the encoder.

BRIEF DESCRIPTION OF DRAWINGS

In order to describe technical solutions of embodiments of the present disclosure more clearly, drawings used in the embodiments will be briefly introduced below. It should be understood that the following drawings only illustrate some embodiments of the present disclosure, so they should not be regarded as limiting the scope of the present disclosure. For those skilled in the art, other relevant drawings can be obtained according to these drawings without any creative effort.

DESCRIPTION OF REFERENCE NUMERALS

1000: Ethernet data transmission system, 100: Ethernet data transmission circuit, 10: polarity processing circuit, 11: detection circuit, 12: control circuit, 20: encoder, 30: Ethernet transceiver circuit, 31: receiving circuit, 32: transmitting circuit, 40: register, 200: terminal.

DETAILED DESCRIPTION OF EMBODIMENTS

In order to make purposes, technical solutions and advantages of embodiments of the present disclosure clearer, the technical solutions in embodiments of the present disclosure will be clearly and completely illustrated below in combination with the accompanying drawings in the embodiments of the present disclosure. Apparently, the illustrated embodiments are some of embodiments of the present disclosure rather than all of embodiments of the disclosure. Generally, components of the embodiments of the present disclosure described and shown in the drawings herein may be arranged and designed in various different configurations. It should be noted that, in case of no conflict, features in the illustrated embodiments of the present disclosure can be mutually combined.

In order to solve the technical problems raised in the background, the related art has proposed encoding/decoding schemes supporting Ethernet transmission, to improve the security during Ethernet transmission.

However, as per the Ethernet protocol, an encoder only supports encoding Ethernet data with a preset polarity.

The inventors of the present disclosure propose an Ethernet data transmission circuit after research. On the one hand, it can improve the security of Ethernet during transmission; on the other hand, without increasing workload of the encoder, a polarity processing circuit of the Ethernet data transmission circuit can be used to process the Ethernet data to be with the preset polarity, to facilitate the encoder to code.

Figure 1:
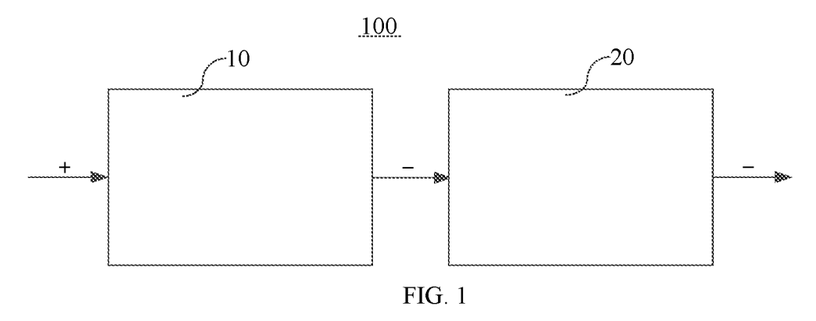
FIG. 1 illustrates a schematic diagram of a connection relationship of various circuits of an Ethernet data transmission circuit provided by an embodiment of the present disclosure.
Figure 2:
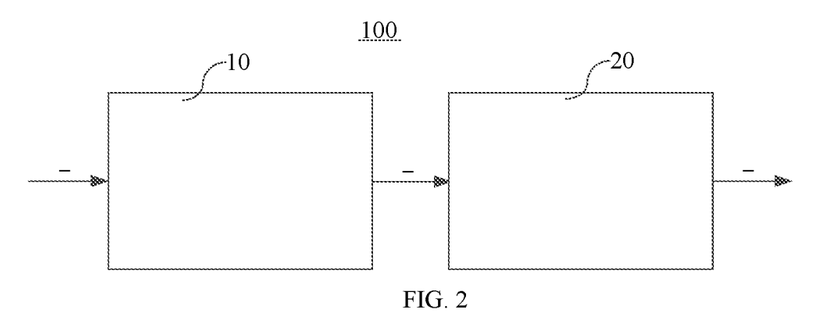
FIG. 2 illustrates another schematic diagram of the connection relationship of various circuits of the Ethernet data transmission circuit provided by an embodiment of the present disclosure.

As shown in FIGS. 1 and 2, an embodiment of the present disclosure provides an Ethernet data transmission circuit 100. The Ethernet data transmission circuit 100 may include a polarity processing circuit 10 and an encoder 20. The polarity processing circuit 10 is configured (i.e., structured and arranged) to process a polarity carried by Ethernet data into a preset polarity. The encoder 20 is configured to receive the Ethernet data and the preset polarity carried by the Ethernet data, and encode the Ethernet data.

In some embodiments, the Ethernet data may be data transmitted in a Gigabit Ethernet. By using the Gigabit Ethernet as a local network, it can increase a network broadband speed.

Specifically, the Gigabit Ethernet may be a combination of both Ethernet communication protocol and optical fiber channel technologies. The serializer/deserializer (SerDes) in a physical layer of the Gigabit Ethernet is used to support a variety of coding schemes and send these coding schemes to an upper layer. Ethernet data entering the physical layer must support an encoding scheme suitable for their transmission medium. The coding scheme of the optical fiber channel can employ an 8-bit to 10-bit (8b10b) coding scheme as a specified coding/decoding scheme.

The encoder 20 is an 8b10b encoder, and can receive 8-bit Ethernet data from the polarity processing circuit 10 and perform 8-bit to 10-bit character conversion, that is, the encoder 20 encodes 8-bit Ethernet data into 10-bit Ethernet data.

In some embodiments, when the Ethernet data are data transmitted in Gigabit Ethernet, the preset polarity can be negative in accordance with the Ethernet protocol, and the polarity processing circuit 10 can process the polarity carried by the received Ethernet data as negative.

In an embodiment, the Ethernet data output from the polarity processing circuit 10 and the preset polarity carried by the Ethernet data can be input to the encoder 20, and the polarity carried by the output Ethernet data encoded by the encoder 20 also is negative.

Figure 3:
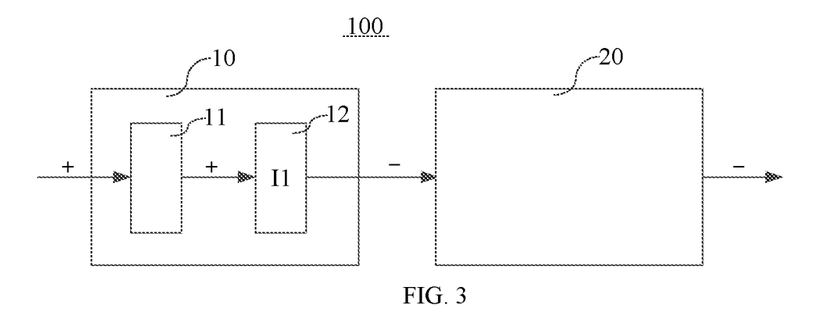
FIG. 3 illustrates a schematic diagram of a connection relationship of various circuits of an Ethernet data transmission circuit provided by another embodiment of the present disclosure.
Figure 4:
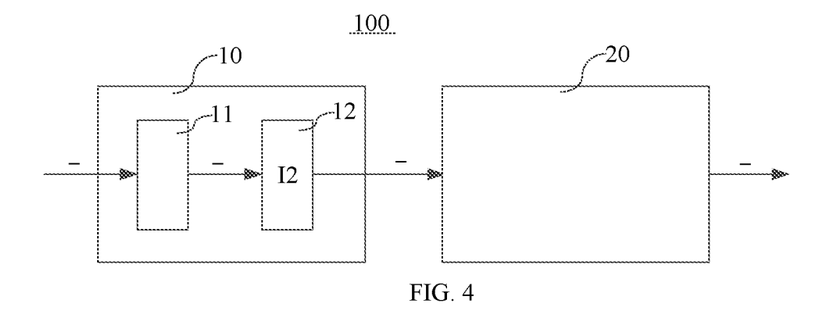
FIG. 4 illustrates another schematic diagram of the connection relationship of circuits of the Ethernet data transmission circuit provided by the another embodiment of the present disclosure.

In some embodiments, a specific circuit structure of the polarity processing circuit 10 is not limited. As shown in FIGS. 3 and 4, the polarity processing circuit 10 may include a detection circuit 11 and a control circuit 12.

Specifically, the detection circuit 11 is configured to detect the polarity carried by the Ethernet data and send the polarity carried by the Ethernet data to the control circuit 12.

When the detection circuit 11 detects that the polarity carried by the Ethernet data is positive (+), the detection circuit 11 sends information representing the polarity carried by the Ethernet data is positive to the control circuit 12. Whereas, when the detection circuit 11 detects that the polarity carried by the Ethernet data is negative, the detection circuit 11 sends information representing the polarity carried by the Ethernet data is negative (−) to the control circuit 12.

The control circuit 12 is configured to process the polarity carried by the Ethernet data into the preset polarity, in response to the polarity carried by the Ethernet data.

As shown in FIG. 3, when the polarity carried by the Ethernet data is not the preset polarity, the control circuit 12 is configured to control the polarity carried by the Ethernet data to be inversed. As shown in FIG. 4, when the polarity carried by the Ethernet data is the preset polarity, the control circuit 12 is configured to control the polarity carried by the Ethernet data to be kept unchanged.

Assuming that the preset polarity is negative, when the polarity carried by the Ethernet data is negative, the control circuit 12 controls the polarity carried by the Ethernet data to be kept unchanged so that the polarity carried by the Ethernet data input to the encoder 20 is still negative. When the polarity carried by the Ethernet data is positive, the control circuit 12 controls the polarity carried by the Ethernet data to be inversed, and after the polarity is inversed, the polarity carried by the Ethernet data can be changed from positive to negative, so that the polarity carried by the Ethernet data input to the encoder 20 is still negative.

In an illustrated embodiment, as shown in FIG. 3, the detection circuit 11 detects that the polarity carried by the currently input Ethernet data is positive, and sends the positive polarity carried by the Ethernet data to the control circuit 12. The control circuit 12 may output a signal I1 to realize an inverse of the polarity carried by the Ethernet data, so that the polarity carried by the Ethernet data is negative when output. Under the action of the signal I1, the polarity carried by Ethernet data can be inversed.

As shown in FIG. 4, the detection circuit 11 detects that the polarity carried by the currently input Ethernet data is negative, and sends the negative polarity carried by the Ethernet to the control circuit 12. The control circuit 12 may output a signal I2 to realize the polarity of the Ethernet data being kept unchanged, so that the polarity carried by the Ethernet data is negative when output. Under the action of the signal I2, the polarity carried by Ethernet data can be kept unchanged.

In some embodiments, the polarity processing circuit 10 may process the polarities carried by all received Ethernet data into the preset polarity. Alternatively, the polarity processing circuit 10 may process the polarities carried by some of the received Ethernet data into the preset polarity, and the polarities carried by the others of the Ethernet data are processed into the preset polarity by other circuit(s) in the Ethernet data transmission circuit 100, as long as the polarity carried by the Ethernet data output from the polarity processing circuit 10 and from the encoder 20 is negative.

In some embodiments, the polarity processing circuit 10 may be an independent circuit. Alternatively, as shown in FIG. 5, the Ethernet data transmission circuit 10 may further include an Ethernet transceiver circuit 30, and the polarity processing circuit 10 may be integrated in the Ethernet transceiver circuit 30.

The embodiments of the disclosure provide the Ethernet data transmission circuit 100, and the Ethernet data transmission circuit 100 may include the polarity processing circuit 10 and the encoder 20. The encoder 20 may be used to encode the Ethernet data, to improve the security of Ethernet data. On this basis, by the use of the polarity processing circuit 10, the polarity carried by the Ethernet data output from the encoder 20 can be processed into negative to follow the Ethernet protocol, avoiding excessively high demand on the encoder 20 due to the encoder 20 not only encodes the Ethernet data but also processes the polarity carried by the Ethernet data, which would cause errors in the encoder 20 during encoding and polarity operation and thereby affect transmission of the Ethernet data.

Figure 5:
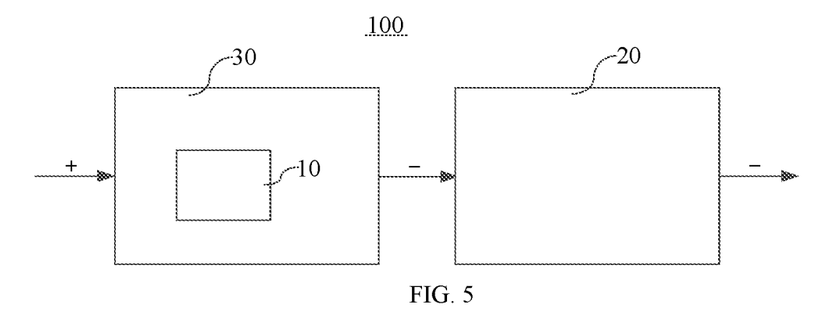
FIG. 5 illustrates a schematic diagram of a connection relationship of various circuits of an Ethernet data transmission circuit provided by still another embodiment of the present disclosure.

In at least one embodiment, as shown in FIG. 5, when the polarity processing circuit 10 is integrated in the Ethernet transceiver circuit 30, the polarity processing circuit 10 may receive the Ethernet data and the polarity carried by the Ethernet data through the Ethernet transceiver circuit 30. After the polarity carried by the Ethernet data is processed into the preset polarity by the polarity processing circuit 10, the polarity processing circuit 10 may transmit the Ethernet data and the preset polarity carried by the Ethernet data to the encoder 20 through the Ethernet transceiver circuit 30.

Figure 6:
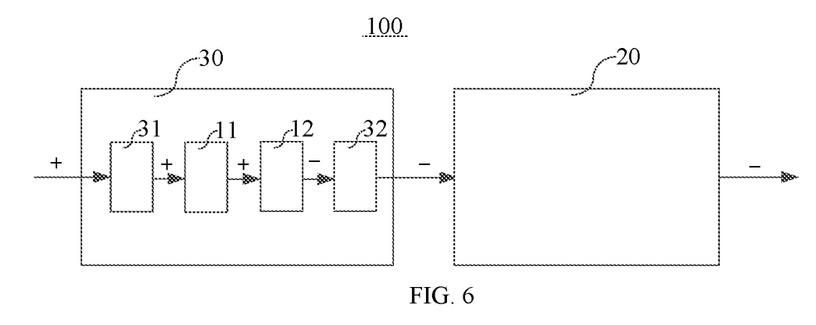
FIG. 6 illustrates a schematic diagram of a connection relationship of various circuits of an Ethernet data transmission circuit provided by even still another embodiment of the present disclosure.

Specifically, as shown in FIG. 6, the Ethernet transceiver circuit 30 may include a receiving circuit 31 and a transmitting circuit 32.

The receiving circuit 31 is configured to receive the Ethernet data and the polarity carried by the Ethernet data, and at least send the polarity carried by the Ethernet data to the detection circuit 11.

The detection circuit 11 is configured to at least receive the polarity carried by the Ethernet data sent from the receiving circuit 31, detect the polarity carried by the Ethernet data, and send the polarity carried by the Ethernet data to the control circuit 12.

The control circuit 12 is configured to receive the polarity carried by the Ethernet data sent by the detection circuit 11, process the polarity carried by the Ethernet data into the preset polarity in response to the polarity carried by the Ethernet data, and send the preset polarity carried by the Ethernet data to the transmitting circuit 32.

The transmitting circuit 32 is configured to receive the preset polarity carried by the Ethernet data transmitted by the control circuit 12, and transmit the Ethernet data and the preset polarity carried by the Ethernet data to the encoder 20.

In addition, the Ethernet transceiver circuit 30 may further include other circuit structure(s), and the illustrated embodiments of the present disclosure do not limit it particularly.

In the embodiment of the disclosure, the polarity processing circuit 10 can be integrated into the Ethernet transceiver circuit 30, the receiving circuit 31 of the Ethernet transceiver circuit 30 can be used to receive the Ethernet data and the polarity carried by the Ethernet data, and the transmitting circuit 32 of the Ethernet transceiver circuit 30 can be used to transmit the Ethernet data and the preset polarity carried by the Ethernet data to the encoder 20. In this way, the polarity processing circuit 10 may not need to include a receiving module and a transmitting module, which can simplify the circuit design of the polarity processing circuit 10 and save a layout area of the Ethernet data transmission circuit 100.

In at least one embodiment, the polarity processing circuit 10 is configured to process a polarity carried by first received Ethernet data (also referred to initial received Ethernet data) into the preset polarity. The polarity processing circuit 10 is further configured to take the preset polarity carried by first output Ethernet data (also referred to initial output Ethernet data) as the polarity carried by received other Ethernet data, and send the first received Ethernet data, the preset polarity carried by the first received Ethernet data, the other Ethernet data and the polarity carried by the other Ethernet data to the encoder 20.

Figure 7:
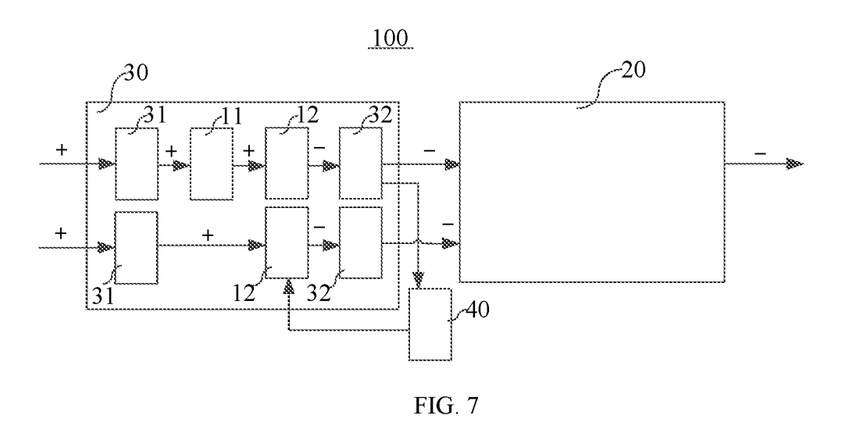
FIG. 7 illustrates a schematic diagram of a connection relationship of various circuits of an Ethernet data transmission circuit provided by further still another embodiment of the present disclosure.

Specifically, as shown in FIG. 7, the Ethernet data transmission circuit 100 may further include a register 40.

The control circuit 12 is further configured to store, in the register 40, the preset polarity carried by the first received Ethernet data when output. In this situation, the control circuit 12 is further configured to send the first output Ethernet data and the preset polarity carried by the Ethernet data to the encoder 20.

The register 40 is configured to call the preset polarity when the control circuit 12 receives the other Ethernet data, and send the preset polarity to the control circuit 12 as the polarity carried by the other Ethernet data.

The control circuit 12 is further configured to control the polarity carried by other Ethernet data to be kept unchanged.

In some embodiments, the control circuit 12 is configured to store the preset polarity carried by the first output Ethernet data in the register 40. Specifically, when the polarity processing circuit 10 is an independent circuit, the control circuit 12 may send the preset polarity carried by the Ethernet data to the register 40 through a transmitting module of the polarity processing circuit 10. Alternatively, when the polarity processing circuit 10 is integrated in the Ethernet transceiver circuit 30, the control circuit 12 may send the preset polarity carried by the Ethernet data to the register 40 through the transmitting circuit 32 of the Ethernet transceiver circuit 30.

In some embodiments, the control circuit 12 is configured to at least receive other Ethernet data, and the control circuit 12 may not receive and process the polarity carried by other Ethernet data.

In some embodiments, the register 40 is configured to call the preset polarity when the control circuit 12 receives other Ethernet data and send the preset polarity to the control circuit 12 as the polarity carried by the other Ethernet data. That is, the register 40 stores the preset polarity therein. After that, regardless of the polarity carried by other Ethernet is positive or negative, the register 40 will call the preset polarity and send the preset polarity to the control circuit 12 as the polarity carried by the other Ethernet data. In this way, it can ensure that the polarity carried by the other Ethernet data is the preset polarity.

In some embodiments, the control circuit 12 is configured to control the polarity carried by the other Ethernet data to be kept unchanged. Specifically, the detection circuit 11 may not need to detect the polarity carried by the other Ethernet data, the control circuit 12 may directly receive the other Ethernet data and receive the preset polarity sent from the register 40 as the polarity carried by the other Ethernet data. After the polarity carried by the other Ethernet data is the preset polarity, the control circuit 12 only needs to control the polarity carried by the other Ethernet data to be kept unchanged, to thereby make the polarity carried by the other Ethernet data output from the polarity processing circuit 10 be the preset polarity.

In an illustrated embodiment, regardless of the polarity carried by the other Ethernet data received by the control circuit 12 is positive or negative, the control circuit 12 can directly call the preset polarity from the register 40 and output the signal I2, to make the polarity carried by the other Ethernet data be kept as the preset polarity.

In some embodiments, Ethernet data received by the polarity processing circuit 10 may include first received Ethernet data and other Ethernet data. The other Ethernet data are Ethernet data other than the first received Ethernet data received by the polarity processing circuit 10.

In some embodiments, the Ethernet data first received by the polarity processing circuit 10 may be the Ethernet data first received by the polarity processing circuit 10 since the Ethernet data transmission circuit 100 is put into use. Alternatively, the Ethernet data first received by the polarity processing circuit 10 may be the Ethernet data first received by the polarity processing circuit 10 during a period of continuous use of the Ethernet data transmission circuit 100.

In some embodiments, the register 40 may be an independent circuit. Alternatively, the register 40 may be integrated in the Ethernet transceiver circuit 30. In the illustrated embodiment of the present disclosure, the polarity carried by the first received Ethernet data is processed into the preset polarity, and the preset polarity is stored in the register 40. After that, regardless of the polarity of the other Ethernet data received by the polarity processing circuit 10 is positive or negative, the preset polarity can be called directly from the register 40. In this case, the detection circuit 11 of the polarity processing circuit 10 may not need to detect the polarity carried by the other Ethernet data, and the control circuit 12 of the polarity processing circuit 10 may not need to selectively output a polarity maintaining signal or a polarity inversing signal in response to the polarity carried by the other Ethernet data, thereby reducing the power consumption of the Ethernet data transmission circuit 100.

Figure 8:
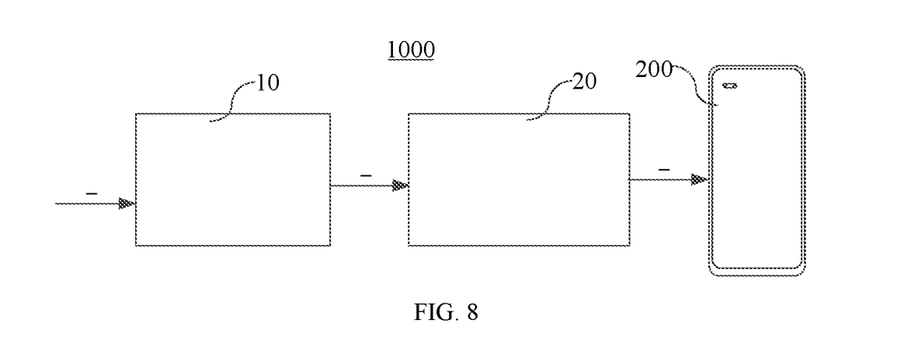
FIG. 8 illustrates a schematic diagram of a connection relationship of various components of an Ethernet data transmission system provided by an embodiment of the present disclosure.

As shown in FIG. 8, an embodiment of the present disclosure provides an Ethernet data transmission system 1000. The Ethernet data transmission system 1000 may include a terminal 200 and the Ethernet data transmission circuit 100 described in any of the foregoing embodiments. The encoder 20 of the Ethernet data transmission circuit 100 is further configured to send encoded Ethernet data to the terminal 200. The terminal 200 is configured to receive and decode the encoded Ethernet data.

After the encoder 20 encodes the Ethernet data, the encoded Ethernet data can be sent to at least one terminal 200 in a form of serial data. After the terminal 200 receives the encoded Ethernet data, the terminal 200 may decode the encoded Ethernet data according to the Ethernet protocol and use the decoded data.

For other description of the Ethernet data transmission system 1000, please refer to the above embodiments and will not be repeated here.

The embodiment of the disclosure provides the Ethernet data transmission system 1000 including the Ethernet data transmission circuit 100 and the terminal. The encoder 20 can be used to encode the Ethernet data. After the Ethernet data are transmitted to the terminal 200, they are decoded and used by the terminal 200, the security of Ethernet data can be improved. On this basis, by the use of the polarity processing circuit 10, the polarity carried by the Ethernet data output from the encoder 20 can be processed into negative to follow the Ethernet protocol, avoiding excessively high demand on the encoder 20 due to the encoder 20 not only encodes the Ethernet data but also processes the polarity carried by the Ethernet data, which would cause errors in the encoder 20 during encoding and polarity operation and thereby affect transmission of the Ethernet data.

Figure 9:
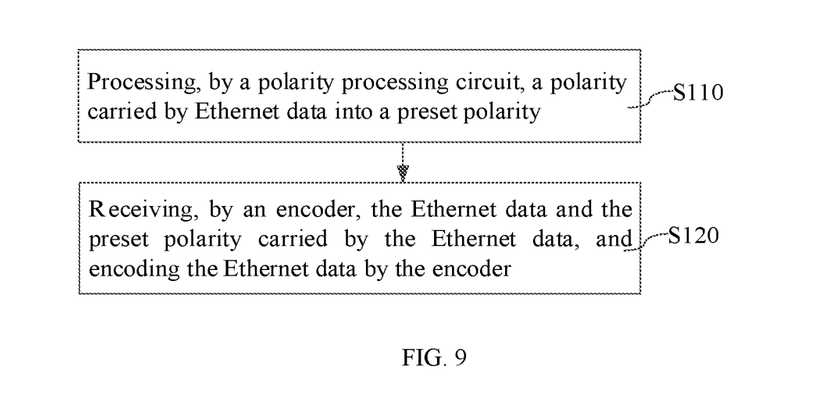
FIG. 9 illustrates a flow diagram of an Ethernet data transmission method provided by an embodiment of the present disclosure.

As shown in FIG. 9, an embodiment of the present disclosure provides an Ethernet data transmission method, including block S110 and block S120 as follows.

At the block S110: processing, by a polarity processing circuit 10, a polarity carried by Ethernet data into a preset polarity.

In some embodiments, the Ethernet data may be data transmitted in a Gigabit Ethernet. By using the Gigabit Ethernet as a local network, a network broadband speed can be increased.

At the block S120: receiving, by an encoder 20, the Ethernet data and the preset polarity carried by the Ethernet data, and encoding the Ethernet data by the encoder 20.

Specifically, the Ethernet data may be data transmitted in a Gigabit Ethernet. By using the Gigabit Ethernet as the local network, it can improve the network broadband speed.

The Gigabit Ethernet can be a combination of both Ethernet communication protocol and optical fiber channel technologies. The serializer/deserializer in a physical layer of the Gigabit Ethernet is used to support multiple coding schemes and send these coding schemes to an upper layer. Ethernet data entering the physical layer must support an encoding scheme suitable for their transmission medium. The coding scheme of the optical fiber channel can employ 8b10b coding scheme as a specified coding/decoding scheme.

The encoder 20 is an 8b10b encoder, and can receive 8-bit Ethernet data from the polarity processing circuit 10 and complete 8-bit to 10-bit character conversion. That is, the encoder 20 encodes 8-bit Ethernet data into 10-bit Ethernet data.

For other description and beneficial effects of the illustrated embodiment of the present disclosure, please refer to the foregoing embodiments, which will not be repeated here.

Figure 10:
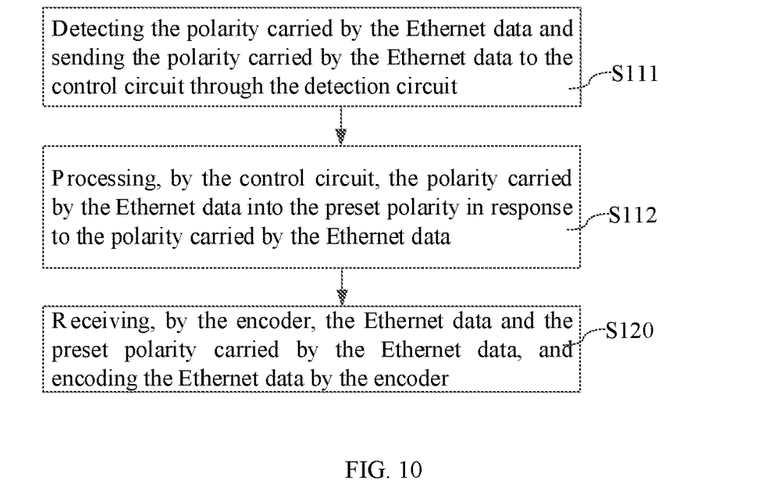
FIG. 10 illustrates a flow diagram of an Ethernet data transmission method provided by another embodiment of the present disclosure.

As shown in FIG. 10, the polarity processing circuit 10 may include a detection circuit 11 and a control circuit 12. An embodiment of the disclosure provides another Ethernet data transmission method, including block S111 through block S120:

At the block S111: detecting the polarity carried by the Ethernet data and sending the polarity carried by the Ethernet data to the control circuit 12 through the detection circuit 11.

Specifically, when the detection circuit 11 detects that the polarity carried by the Ethernet data is positive, the detection circuit 11 sends information representing the polarity carried by the Ethernet data is positive (+) to the control circuit 12. When the detection circuit 11 detects that the polarity carried by the Ethernet data is negative, the detection circuit 11 sends information representing the polarity carried by the Ethernet data is negative (−) to the control circuit 12.

At the block S112: processing, by the control circuit 12, the polarity carried by the Ethernet data into the preset polarity in response to the polarity carried by the Ethernet data.

As shown in FIG. 3, when the polarity carried by the Ethernet data is not the preset polarity, the control circuit 12 controls the polarity carried by the Ethernet data to be inversed. As shown in FIG. 4, when the polarity carried by the Ethernet data is the preset polarity, the control circuit 12 controls the polarity carried by the Ethernet data to be kept unchanged.

Assuming that the preset polarity is negative, when the polarity carried by the Ethernet data is negative, the control circuit 12 controls the polarity carried by the Ethernet data to be kept unchanged so that the polarity carried by the Ethernet data input to the encoder 20 is still negative. When the polarity carried by the Ethernet data is positive, the control circuit 12 controls the polarity carried by the Ethernet data to be inversed, and after the polarity is inversed, the polarity carried by the Ethernet data can be changed from positive to negative, so that the polarity carried by the Ethernet data input to the encoder 20 is still negative.

In an illustrated embodiment, as shown in FIG. 3, the detection circuit 11 detects that the polarity carried by the currently input Ethernet data is positive, and sends the positive polarity carried by the Ethernet data to the control circuit 12. The control circuit 12 may output the signal I1 to inverse the polarity carried by the Ethernet data, so that the polarity carried by the Ethernet data is negative when output. Under the action of the signal I1, the polarity carried by Ethernet data can be inversed.

As shown in FIG. 4, the detection circuit 11 detects that the polarity carried by the currently input Ethernet data is negative, and sends the negative polarity carried by the Ethernet to the control circuit 12. The control circuit 12 may output the signal I2 to keep the polarity of the Ethernet data unchanged, so that the polarity carried by the Ethernet data is negative when output. Under the action of the signal I2, the polarity carried by Ethernet data can be kept unchanged.

At the block S120: receiving, by the encoder 20, the Ethernet data and the preset polarity carried by the Ethernet data, and encoding the Ethernet data by the encoder 20.

For other description and beneficial effects of the illustrated embodiments of the present disclosure, please refer to the foregoing embodiments, which will not be repeated here.

Figure 11:
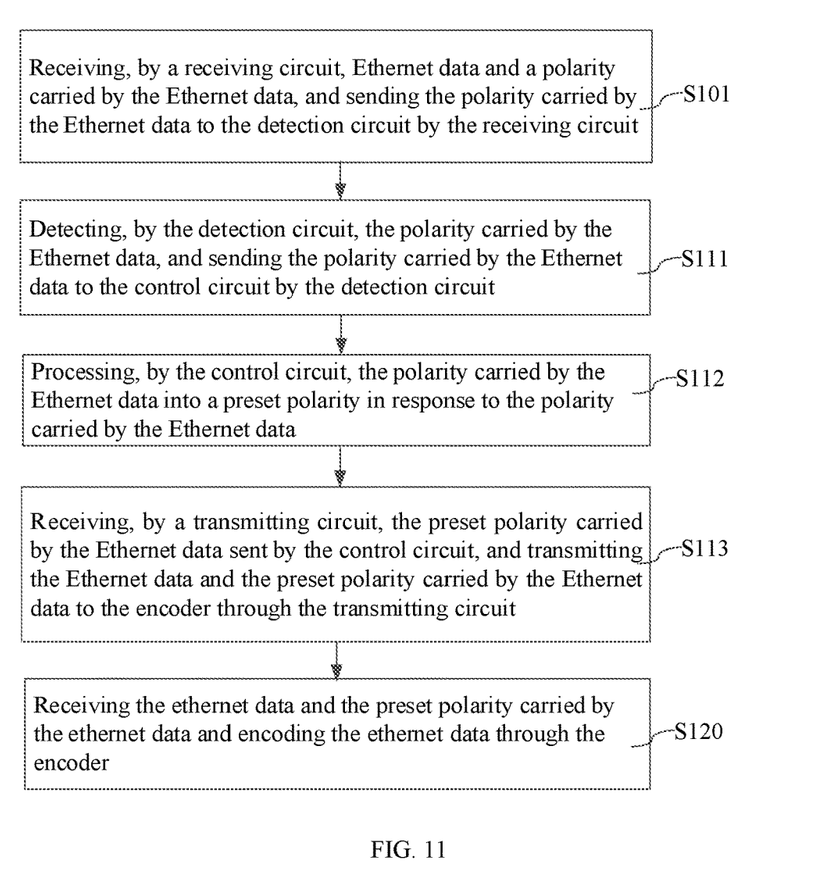
FIG. 11 illustrates a flow diagram of an Ethernet data transmission method provided by still another embodiment of the present disclosure.

As shown in FIG. 11, the Ethernet data transmission circuit 100 may further include an Ethernet transceiver circuit 30, and the polarity processing circuit 10 is integrated into the Ethernet transceiver circuit 30. An embodiment of the disclosure provides still another Ethernet data transmission method, including block S101 through block S120 as follows.

At block S101: receiving, by a receiving circuit 31, Ethernet data and a polarity carried by the Ethernet data, and sending the polarity carried by the Ethernet data to the detection circuit 11 by the receiving circuit 31.

At the block S111: detecting, by the detection circuit 11, the polarity carried by the Ethernet data, and sending the polarity carried by the Ethernet data to the control circuit 12 by the detection circuit 11.

At the block S112: processing, by the control circuit 12, the polarity carried by the Ethernet data into a preset polarity in response to the polarity carried by the Ethernet data.

At the block S113: receiving, by a transmitting circuit 32, the preset polarity carried by the Ethernet data sent by the control circuit 12, and transmitting the Ethernet data and the preset polarity carried by the Ethernet data to the encoder 20 through the transmitting circuit 32.

At the block S120: receiving, by the encoder 20, the Ethernet data and the preset polarity carried by the Ethernet data, and encoding the Ethernet data through the encoder 20.

For the description and beneficial effects of the illustrated embodiment of the present disclosure, please refer to the above embodiments and will not be repeated here.

Figure 12:
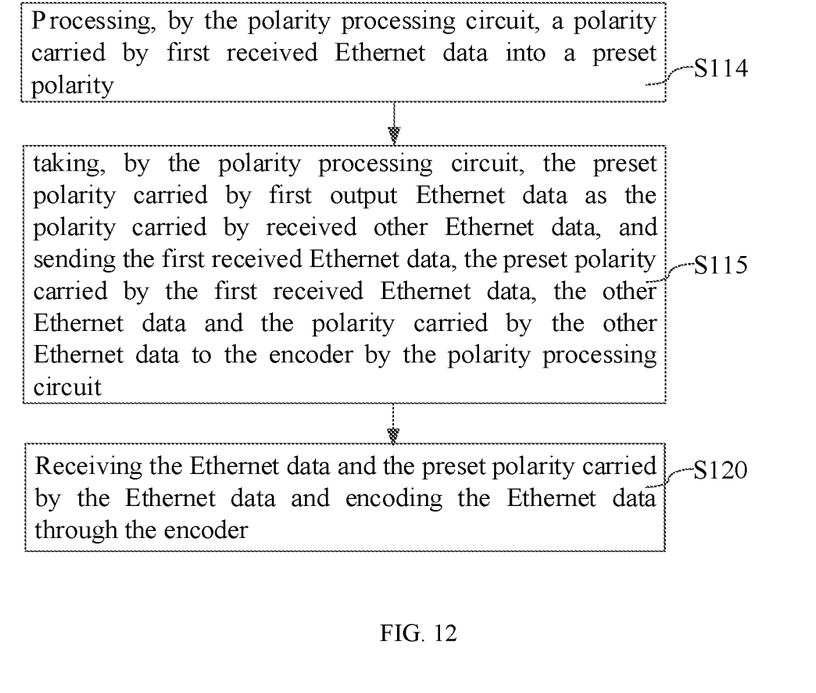
FIG. 12 illustrates a flow diagram of an Ethernet data transmission method provided by even still another embodiment of the present disclosure.

As shown in FIG. 12, the Ethernet data transmission circuit 100 may further include an Ethernet transceiver circuit 30, and the polarity processing circuit 10 is integrated into the Ethernet transceiver circuit 30. An embodiment of the disclosure provides even still another Ethernet data transmission method, including block S114 through block S120 as follows.

At the block S114: processing, by the polarity processing circuit 10, a polarity carried by first received Ethernet data into a preset polarity.

At the block S115: taking, by the polarity processing circuit 10, the preset polarity carried by first output Ethernet data as the polarity carried by received other Ethernet data, and sending the first received Ethernet data, the preset polarity carried by the first received Ethernet data, the other Ethernet data and the polarity carried by the other Ethernet data to the encoder 20 by the polarity processing circuit 10.

Specifically, the Ethernet data transmission circuit 100 may include a register 40, and the block S115 may include block S1151 through block S1153 as follows.

At the block S1151: storing, in the register 40, the preset polarity carried by the first received Ethernet data when output through the control circuit 12.

At the block S1152: calling the preset polarity when the control circuit 12 receives other Ethernet data and sending the preset polarity to the control circuit 12 as the polarity carried by the other Ethernet data through the register.

At the block S1153: controlling the polarity carried by the other Ethernet data to be kept unchanged through the control circuit 12.

At the block S120: receiving the Ethernet data and the preset polarity carried by the Ethernet data and encoding the Ethernet data through the encoder 20.

For other description and beneficial effects of the illustrated embodiment of the present disclosure, please refer to the foregoing embodiments, which will not be repeated here.

Finally, it should be noted that the above embodiments are only used to illustrate the technical solutions of the present disclosure, rather than limiting it. Although the present disclosure has been described in detail with reference to the above embodiments, those skilled in the art should understand that it is still possible to modify the technical solutions described in the above embodiments or equivalently substitute some of the technical features. These modifications or substitutions do not drive the essence of the corresponding technical solutions out of the spirit and scope of the technical solutions of the embodiments of the present disclosure.

What is claimed is:

1. An Ethernet data transmission circuit, comprising:
a polarity processing circuit, configured to process a polarity carried by Ethernet data into a preset polarity, wherein the Ethernet data is transmitted in Gigabit Ethernet, and the polarity processing circuit is integrated in an Ethernet transceiver circuit; and
an 8-bit to 10-bit (8b10b) encoder connected with the polarity processing circuit, wherein the 8b10b encoder is configured to receive the Ethernet data and the preset polarity carried by the Ethernet data, and encode the Ethernet data with the preset polarity for transmission;
wherein the polarity processing circuit comprises a detection circuit and a control circuit, the detection circuit is configured to detect a polarity carried by first received Ethernet data and send the polarity carried by the first received Ethernet data to the control circuit; and the control circuit is configured to process the polarity carried by the first received Ethernet data into the preset polarity, in response to detection of the polarity carried by the first received Ethernet data;
the Ethernet data transmission circuit further comprises a register;
the control circuit is further configured to store, in the register, the preset polarity carried by the first received Ethernet data when being output;
the register is configured to call the preset polarity when the control circuit receives other Ethernet data, and send the preset polarity to the control circuit; and
the control circuit is further configured to directly set the preset polarity as the polarity carried by the other Ethernet data irrespective of an original polarity of the other Ethernet data.

2. The Ethernet data transmission circuit according to claim 1, wherein the control circuit is configured to control the polarity carried by the first received Ethernet data to be kept unchanged, in response to detecting that the polarity carried by the first received Ethernet data is the preset polarity;
   the control circuit is further configured to control the polarity carried by the first received Ethernet data to be inversed, in response to detecting that the polarity carried by the first received Ethernet data is not the preset polarity.

3. The Ethernet data transmission circuit according to claim 2,
   wherein the Ethernet transceiver circuit comprises a receiving circuit and a transmitting circuit;
   wherein the receiving circuit is configured to receive the Ethernet data and the polarity carried by the Ethernet data, and send the Ethernet data and the polarity carried by the Ethernet data to the detection circuit or the control circuit; and
   wherein the transmitting circuit is configured to receive the preset polarity carried by the Ethernet data sent by the control circuit, and transmit the Ethernet data and the preset polarity carried by the Ethernet data to the 8b10b encoder.

4. The Ethernet data transmission circuit according to claim 1,
   wherein the control circuit is further configured to keep the set polarity carried by the other Ethernet data unchanged.

5. The Ethernet data transmission circuit according to claim 1, wherein the Ethernet transceiver circuit is a Gigabit Ethernet transceiver circuit.

6. The Ethernet data transmission circuit according to claim 1, wherein the preset polarity is negative.

7. An Ethernet data transmission method, implemented by an Ethernet data transmission circuit, the method comprising:
   processing, by a polarity processing circuit of the Ethernet data transmission circuit, a polarity carried by Ethernet data into a preset polarity, wherein the Ethernet data is transmitted in Gigabit Ethernet, and the polarity processing circuit is integrated in an Ethernet transceiver circuit; and
   receiving, by an 8-bit to 10-bit (8b10b) encoder of the Ethernet data transmission circuit, the Ethernet data and the preset polarity carried by the Ethernet data, and encoding, by the 8b10b encoder, the Ethernet data with the preset polarity for transmission;
   the processing, by the polarity processing circuit of the Ethernet data transmission circuit, the polarity carried by Ethernet data into the preset polarity, comprises:
      detecting, by a detection circuit of the polarity processing circuit, a polarity carried by first received Ethernet data, and sending the polarity carried by the first received Ethernet data to a control circuit of the polarity processing circuit;
      processing, by the control circuit, the polarity carried by the first received Ethernet data into the preset polarity, and storing, by the control circuit, the preset polarity carried by the first received Ethernet data into a register of the Ethernet data transmission circuit;
      calling, by the register, the preset polarity in response to the control circuit receiving other Ethernet data, and sending, by the register, the preset polarity to the control circuit; and
      directly setting, by the control circuit, the preset polarity as the polarity carried by the other Ethernet data irrespective of an original polarity of the other Ethernet data.

8. The Ethernet data transmission method according to claim 7, wherein the processing, by the control circuit, the polarity carried by the first received Ethernet data into the preset polarity, comprises:
   controlling, by the control circuit of the polarity processing circuit, the polarity carried by the first received Ethernet data to be kept unchanged, in response to the polarity carried by the first received Ethernet data being the preset polarity; or,
   controlling, by the control circuit of the polarity processing circuit, the polarity carried by the first received Ethernet data to be inversed, in response to the polarity carried by the first received Ethernet data being not the preset polarity.

9. The Ethernet data transmission method according to claim 7, wherein the preset polarity is negative.

* * * * *